April 25, 1939.  J. F. ROBB  2,155,995

MACHINE FOR MAKING FROZEN CONFECTIONS OR THE LIKE

Filed July 11, 1936   10 Sheets-Sheet 1

Inventor
John F. Robb

By Robb & Robb
Attorneys

April 25, 1939.   J. F. ROBB   2,155,995
MACHINE FOR MAKING FROZEN CONFECTIONS OR THE LIKE
Filed July 11, 1936    10 Sheets-Sheet 6

Inventor
John F. Robb
By Robb & Robb
Attorneys

April 25, 1939.  J. F. ROBB  2,155,995
MACHINE FOR MAKING FROZEN CONFECTIONS OR THE LIKE
Filed July 11, 1936    10 Sheets-Sheet 7

April 25, 1939. J. F. ROBB 2,155,995
MACHINE FOR MAKING FROZEN CONFECTIONS OR THE LIKE
Filed July 11, 1936 10 Sheets-Sheet 9

Inventor
John F. Robb
Robb & Robb
Attorneys

April 25, 1939. J. F. ROBB 2,155,995
MACHINE FOR MAKING FROZEN CONFECTIONS OR THE LIKE
Filed July 11, 1936 10 Sheets-Sheet 10

Inventor
John F. Robb
By Robb & Robb
Attorneys

Patented Apr. 25, 1939

2,155,995

UNITED STATES PATENT OFFICE 2,155,995

MACHINE FOR MAKING FROZEN CONFECTIONS OR THE LIKE

John F. Robb, Cleveland Heights, Ohio

Application July 11, 1936, Serial No. 90,212

16 Claims. (Cl. 107—8)

The present invention comprises a novel machine for facilitating the manufacture of frozen confections.

The machine of the invention is designed primarily to cut a block of ice cream or frozen substance having handles or sticks properly positioned therein, into a plurality of ice cream confection units, or "suckers" as they are commonly called in the art.

For a full understanding of the invention, reference is to be had to United States Letters Patent of Harry B. Burt, No. 1,470,524 and No. 1,470,- 525 of October 9, 1923, wherein methods and apparatus for the making of ice cream or similar frozen confections are described. The said methods and apparatus involve the freezing of a mass into a substantially frozen block, after sticks or handles for the ice cream suckers or units have been inserted in the mass at properly located intervals of space.

It is contemplated that the said frozen block of ice cream, or the like, shall be subsequently cut to form the individual frozen confection units, each containing its stick or handle by which it is manipulated for purposes of completing the manufacture of the confection, and likewise, manipulated for eating.

A machine of my invention, as hereinafter described, is adapted to have disposed therein, the solid block of frozen material such as ice cream, sherbet, or the like, with the sticks or handles for the confection units frozen therein, and then by the automatic operation of the machine, the said frozen block of material will be cut into the individual confection units each equipped with its handle. After the confection units are cut to provide the separate frozen confections with their handles congealed thereto, the said confections are ejected from the hopper in which the cutting operation is performed, are caused to be automatically interengaged with gripping members on a conveyer, and then to travel with the conveyer. While being carried by the gripping members of the conveyer, which gripping members engage the handles or sticks of the confections, the confections are moved so as to be dipped in a coating bath of chocolate, or a similar coating, and then removed from said bath by the continued travel of the conveyer after which they are released from the gripping members of the conveyer, completely made and ready to be inserted in a wrapper or envelope for vendition.

Another feature of the invention resides in provisions for automatically and mechanically inserting the sticks or handles in the block of frozen material later to be operated upon by the cutting, and ejecting mechanism.

The machine of my invention contemplates the association of a series of mechanisms including principally stick inserting mechanism, the cutting and ejecting mechanism previously referred to, and the conveyer mechanism with its gripping appliances. These several mechanisms are really unit mechanisms that are susceptible of individual use if desired, but according to the invention, their functions and operations are coordinated into one general operating machine.

Subsidiary features of the invention reside in the use of a special arrangement of ejector devices made up of separately operating sets of such devices, special means whereby the confection conveyer will actuate or move the confections individually as they are carried in the travel of the conveyer, whereby to dip the confections into the coating substance, by which the edible portions thereof are to be covered, and the provision of control devices for timing the actuation of the ejector and cutting instrumentalities in relation to the operation of the conveyer so that the conjoint functioning of these mechanisms will be insured in the operation of the machine.

In the accompanying drawings:

Figure 16 is a view similar to Figure 15 but showing the stick inserting unit moved to stick inserting position.

Figure 17 is a still further enlarged fragmentary view in top plan of one end of the stick-feeding unit.

Figure 1:
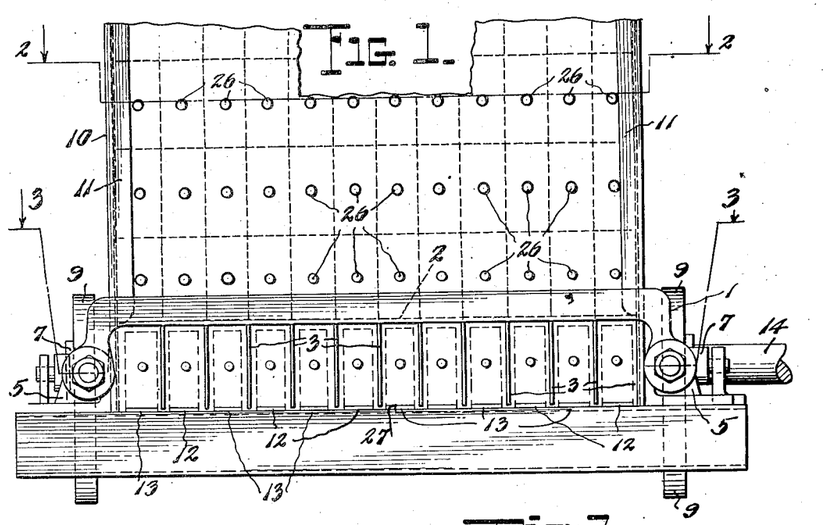
Figure 1 is a fragmentary front elevation of the cutting mechanism and block ejector devices, the view being taken between this mechanism and the conveyer so that the conveyer is not shown.
Figure 2:
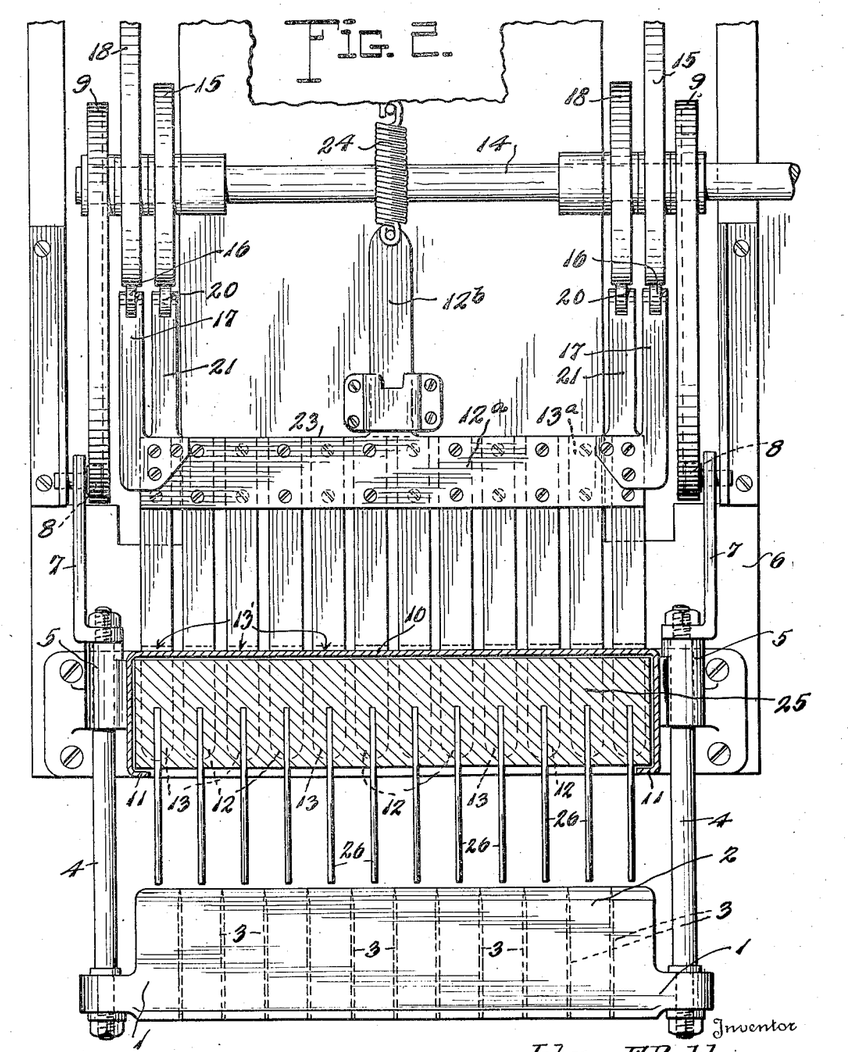
Figure 2 is a horizontal sectional view taken approximately on the plane indicated by the line 2—2 of Figure 1, showing the cutting knife in its fully retracted position, just prior to cutting the block of frozen material into the individual confection units or suckers. The rear portion of this unit mechanism of the machine is broken away.
Figure 3:
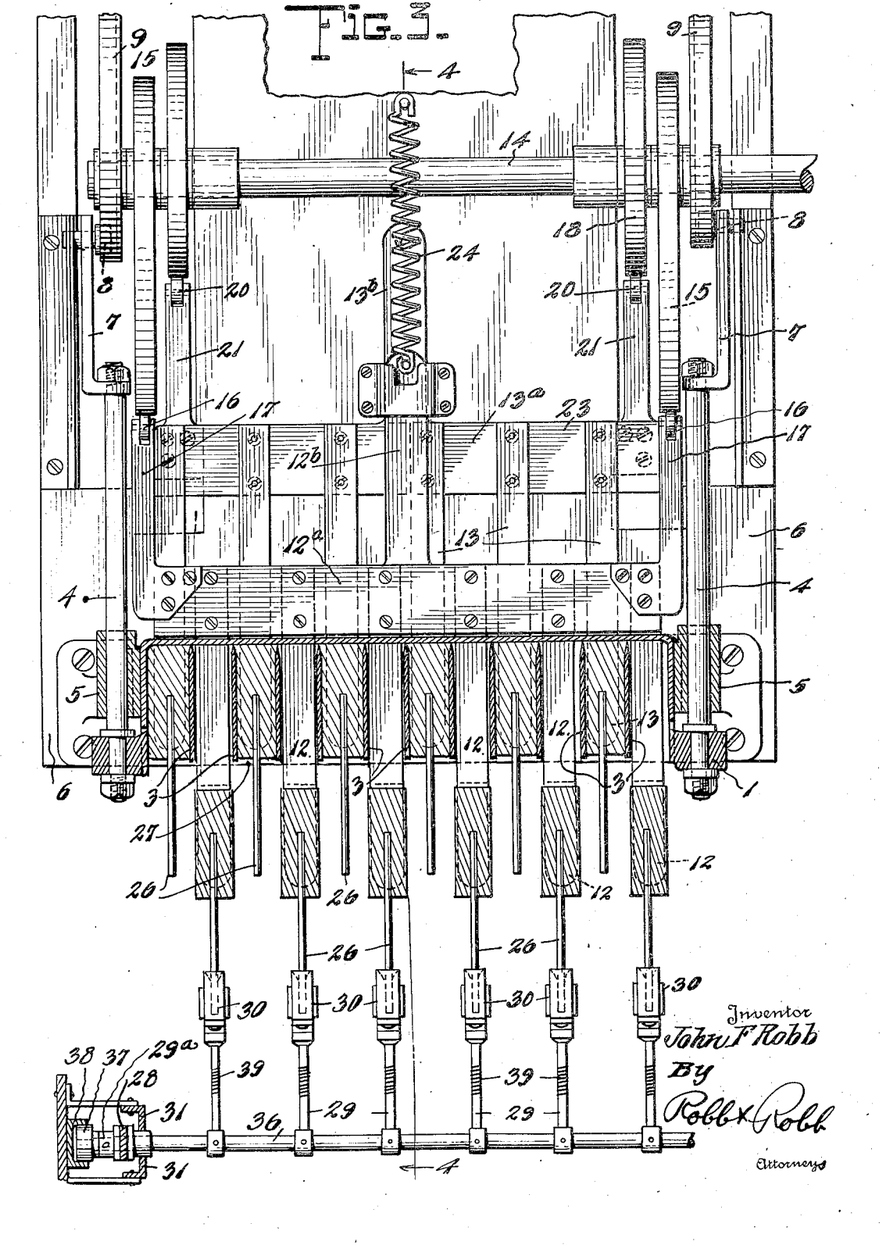
Figure 3 is a view similar to Figure 2 but taken on the line lower down, namely, on the line 3—3 of Figure 1, and illustrating the cutting members or knives after they have been moved to cut the block of ice cream or frozen material into the individual frozen units; also, showing one ejector set in projected position as when forcing the confection units ejected thereby into their projected positions causing the sticks or handles thereof to be moved in to engagement with the gripping members on the conveyer. A portion of the conveyer is illustrated in the lower left corner of this view.

Referring to Figures 1, 2 and 3 particularly, it will be observed that there is provided a cutter bar 1, comprising a horizontal cutter 2, and a series of vertical cutters 3 at right angles to the horizontal cutter, the several parts 2 and 3 being virtually cutting knives, as will be self evident. The said cutting means constitutes a unit carried by the horizontal reciprocatory rods 4, which are mounted in guides 5 on the frame 6 of the machine. The rods 4 are connected at their inner ends with angle plates 7, carrying rollers 8, which operate in cam members 9, that form a part of a cam unit which controls the timed or synchronized operation of the cutter and ejector mechanism.

On the frame 6 of the machine is disposed a vertical hopper 10 of somewhat U-shaped form in cross-section, and seen best in Figures 2 and 3. This hopper is vertically disposed, and of a size adapted to receive a block of frozen material, such as ice cream, sherbet, water ice, or the like. The hopper 10 has the front stop flanges 11, and said hopper at its lower end is cut away so as to form a clearance space for the operation of the ejectors by which the confection units are pushed out of the lower end of the hopper after said units have been cut to separate them from the main mass or block of ice cream in the hopper.

The ejector mechanism comprises what is referred to herein as a first set of ejectors 12, which move together to push out of the hopper 10 a series of the confection units spaced from each other. A second set of ejectors 13 is employed, and they operate between the ejectors of the first set 12. The ejectors 12 are carried by ejector plates 12a, and the ejectors 13 are carried by ejector plates 13a, see Figure 10.

The purpose in using two sets of ejectors 12 and 13 is to handle the confection units in separate series, after they have been cut into the said individual units by the cutter bar mechanism. If desired, the ejector mechanism may comprise ejectors all working in unison, but such is not the preferred arrangement set forth herein. As seen in Figure 3, one of the sets of the ejectors is illustrated as having been operated to move its engaged series of confections to cause the handles or sticks of the latter to be gripped by the gripping members of the conveyer. Also, as seen in this figure, the other series of ejector stands in retracted position previous to the operation thereof on the confections intermediate those that have been previously ejected.

From the foregoing, it will be observed that the sets of ejectors 12 and 13 work alternately in performing their ejecting functions, and the means for operating the ejectors comprises pairs of cams on the ejector shaft 14, see Figures 2 and 3, which cams go to make up the cam unit previously described as including the cams 9 that operate the cutter means previously set forth.

Figure 10:
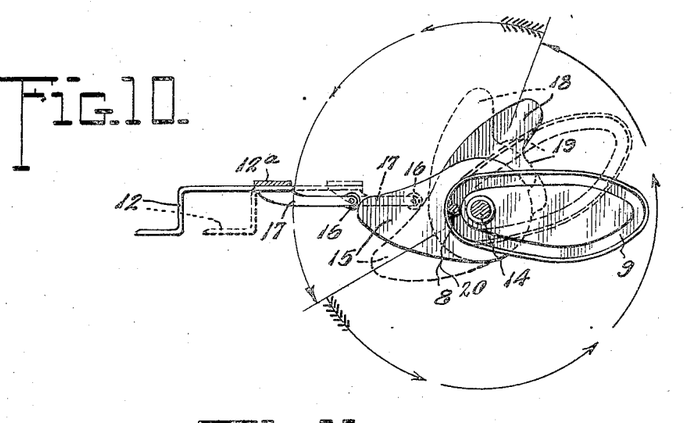
Figure 10 is a fragmentary diagrammatic view of the cam actuating unit for the cutter and ejector mechanism, the full line position representing that of the first ejector unit in its fully projected condition for transferring one group of cut confections to the conveyer unit. The dotted line position represents the first position at which the operating cam unit comes to rest with the first ejector unit fully retracted as distinguished from its projected position.

As shown in Figure 10, the shaft 14 carries a pair of cams 15 for operation with the first set of ejector devices 12, said cams engaging rollers 16 of arms 17 attached to and projecting rearwardly from the ejector plates 12a. Likewise, the shaft 14 carries a pair of cams 18 equipped with auxiliary or supplemental cam parts 19, and said cam elements 19 coact with rollers 20 on arms 21, which are attached to and project rearwardly from the ejector plates 13a.

The purpose in providing the cam members 9, 15, and 18—19 in duplicate, is to insure merely that a true horizontal movement will be effected in reference to the horizontal reciprocations of the ejectors and cutting devices. It is notable that the ejectors 12 are connected by a cross plate or head 12a, and the second set of ejectors 13 are connected by a similar cross plate or head 13a. The members 17 are directly carried by the cross head 12a of the ejector set 12 and the members 21 are directly carried by the cross head or plate 13a of the ejector set 13. For normally pulling the sets of ejectors 12 and 13 rearwardly relatively to the hopper 10, or, in other words, to retract the ejectors, coil springs 24, see Figures 2 and 3, are employed. One of these coil springs 24 is secured to the central guide member 12b while the other spring is secured to the other guide member 13b extending rearwardly from the cross plate 13a. The members 13a—13b are indicated generally at 17. The other ends of the spring 24 are secured to the frame 6. Forward movement of the cross plates 12a or 13a places one or the other of the springs 24 under tension.

It is to be borne in mind that the two sets of ejectors 12 and 13 work successively to push or eject the cut confection units or suckers, out from between the vertical knives, to transfer the said units so ejected on to the gripping devices of a step by step moving conveyer, by which the confections are caused to travel to and through the dipping and coating bath. Means are provided for controlling the movement of the cutters, the ejectors, and the conveyer, so as to properly synchronize these operations, and such means will be later described.

Figures 11, 12, 13:
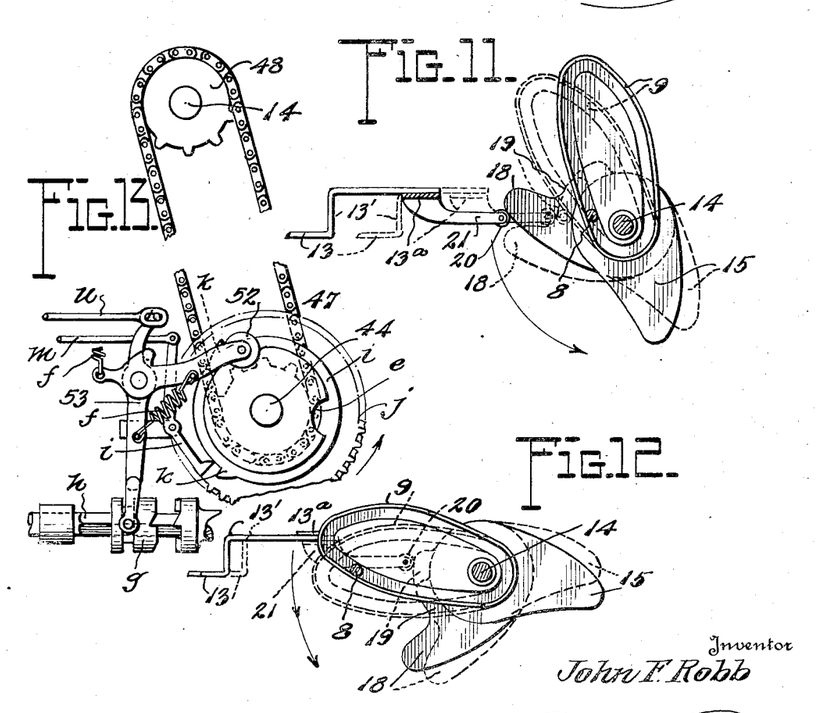
Figure 11 is a view similar to Figure 10, but showing the cam unit during its next cycle of operation. The full lines represent the position of the cams when the second cam members shift the second set of ejectors for transferring the second group of cut confections to the conveyer unit. The dotted lines indicate the second position at which the cam unit comes to rest while the conveyer advances the now gripped suckers toward the coating mechanism.
Figure 12 is a view similar to Figure 10 but showing the third cam members of the cam unit in the knife actuating position, and also showing the cooperation of the supplemental or auxiliary cam parts on the second cam members, which auxiliary cam parts hold the second set of ejectors slightly projected to prevent dropping of the block of ice cream before the knife or cutting bar has moved to fully retracted position, in order to clear the sticks or handles of the confection units as the block drops when the second ejector set moves out of the way.
Figure 13 is a fragmentary view of the cutting and ejecting unit control device showing the same at rest and also showing the chain drive to the sprocket on the cam unit shaft.

It will be assumed that the cam unit illustrated in Figures 10, 11 and 12 is operated at its proper synchronized time, and the operation of the cutting and ejecting devices will be described with this in view.

Figure 4:
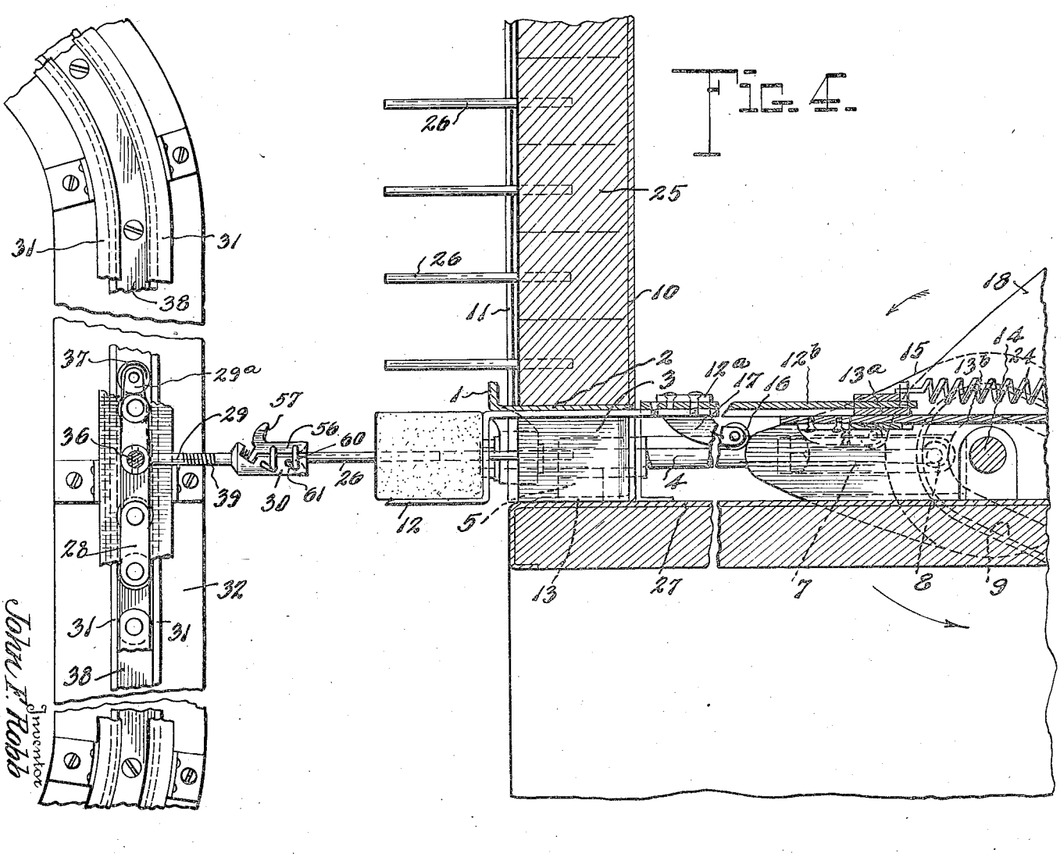
Figure 4 is a fragmentary vertical sectional view taken approximately on the line 4—4 of Figure 3.

For the purpose of this immediate description, it will also be assumed that the material operated upon is a block of ice cream, or frozen confection material, having the handles or sticks frozen therein, as shown in Figure 4, the said block being designated 25, and the sticks or handles 26. The block of frozen material 25 is em placed in the hopper 10 therefor, and is allowed to rest on the horizontal cutter or knife 2 (or on the ejectors, if they should happen to be cut when the machine is stopped).

In Figure 4 the block of frozen material is supported on the horizontal knife 2. The machine now being started, the cam members 9, which are equipped with cam grooves, move the cutter unit, and cutters 2 and 3 outwardly, until the horizontal cutter 2 moves from beneath the block of confection matter 25, whereupon said block drops very slightly on the upper rear shoulder portions of the set of ejector members 13. The supplemental or auxiliary cam parts 19 of the cams 18 hold the said second set of ejectors 13 from returning home until the knives 2 and 3 have moved fully outwards in front of the block of frozen matter 25, in order that the sticks or handles may not strike the horizontal knife as the block 25 drops. It will be seen in Figure 2, that the fully inoperative position of the cutter or knife 2 just clears the outer ends of the sticks or handles 26.

As the cam unit comprising the cams 9, 15 and 18 moves by rotation and the cutters 2 and 3 reach about their extreme retracted or inoperative positions, the rollers 20 holding the second set of ejectors 13 slightly projected, will now move out of the way permitting said ejectors to fully return or move out from under the block of material 25, permitting said block 25 to drop down to the supporting platform or table 27, see Figure 4.

As the cam unit, just referred to, continues to rotate, the cutters 2 and 3 are driven inwardly through the block or cake of frozen substance 25, cutting the same into a plurality of small blocks constituting individual confection bodies or suckers, with their handles or sticks 26 already in position.

Figure 5:
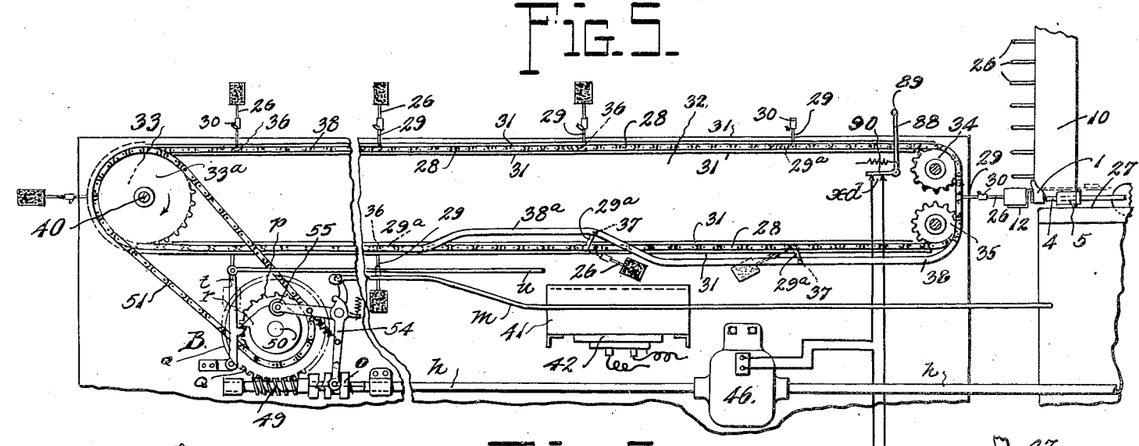
Figure 5 is an elevation of my complete confection machine with the exception that at the right hand portion of the figure the cutting and ejecting mechanism is broken away and also portions of the side frame are broken away to show the conveyer chain, its guide members, and the coating mechanism, more clearly.

The conveyer mechanism, seen best in Figures 4 and 5, comprises a chain 28, with which are connected a series of supporting members 29, equipped with grippers 30 at their outer ends. Before the cutter mechanism started to move, as just described, the conveyer comes to rest with a fresh or empty set of the gripping devices 30 in proper aligned position relative to the sticks 26 of the now cut confections at the lower end of the hopper 10. The cycle of movement of the cam unit 9, 15 and 18 is from the dotted line position of Figure 11, through the position shown in Figure 12, and comes to a stop in the dotted line position of Figure 10.

It should be noted that after the cam unit causes the cutters 2 and 3 to cut the lower end of the block 25, into the individual confections, the operation of the cam unit continues until the first set of ejectors 12 move every other, or alternate cut confections, from their positions between the vertical cutters 3 to insert the handles or sticks of the said confections in to the grippers 30.

The ejectors 12 then return to their retracted positions so as to clear the bodies of the confections that are now supported on the grippers 30 of the conveyer chain 28.

Figure 6:
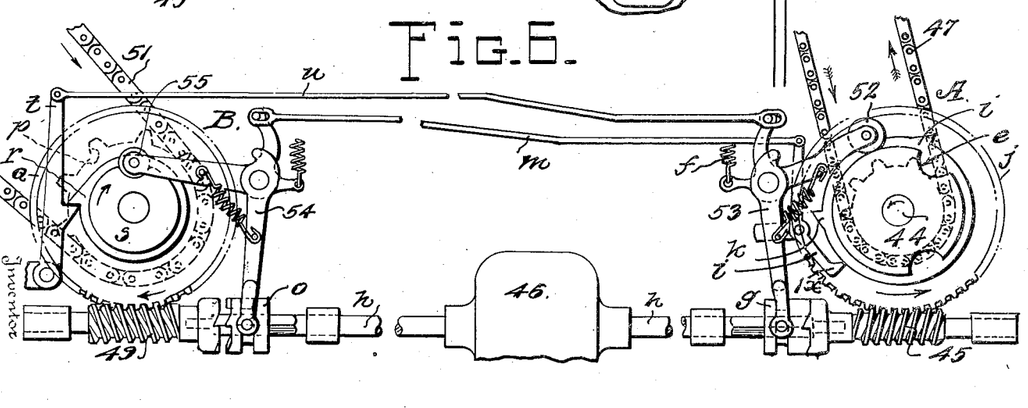
Figure 6 is an enlarged plan view of the selective control mechanism to synchronize the operation of the conveyer and the cutting mechanism. In this view the conveyer actuating control unit is shown at rest or stopped while the cutter and ejector mechanism operating control unit is shown in operation.

Reference will be now made to Figure 6 to describe the control mechanism by which the operation of the cam unit above set forth is controlled to intermittently actuate the cutter and ejector mechanism, and to intermittently operate the conveyer previously referred to. It may be noted, however, that the conveyer chain 28, as seen in Figure 5, operates between guide members 31 on the frame 32 of said conveyer, and the movement of the conveyer chain 28 as to direction, is controlled by the said guide members 31. The chain 28 is an endless chain preferably of the sprocket type and passes at one end about a large drive sprocket 23, and at its other end, which is adjacent to the hopper 10, said chain passes about small idler sprockets 34 and 35. The carrier members 29 having the grippers 30 offstanding at right angles to the chain 28 are normally held in such positions by means of arms 29a rigid with the said members 29 and extending at right angles thereto from the axes 36 of said members 29. The arms 29a of the carrier members 29 are equipped with rollers 37, see lower left hand of Figure 3, and these rollers operate in U-shaped guides 38 which are spaced from the guides 31, previously referred to.

Figure 3 illustrates more fully how the chains 28 are mounted in cooperation with the guides 31. The chains 28 are in duplicate or two in number, and located in spaced relation, being connected together by means of the axes or pintle members 36, previously referred to, as carrying the carrier members 29. The axes or pintle members 36 are really rods that span the space between the spaced chains 28 of the conveyer, and each of the members 36, as seen in Figure 3, supports, according to the present construction, six of the grippers 30, directly carried by the members 29. If desired, the carrier members 29 may each be made with a shank, a portion of which is comprised of close coils, like a coiled spring, as at 39, whereby the shanks of the carrier members may flex slightly to accommodate for slight misalignment of the sticks or handles 26 of the suckers with the socket portions of the grippers 30.

As the conveyer comprising the spaced chains 28 and carriers 29 with their grippers, is driven, by actuation of the driving sprockets 33, on the driven shaft 40, see Figure 5, the carrier members 29 will be progressively advanced to positions opposite the sticks of the cut confections, in an obvious manner. The movement of the conveyer is intermittent, as previously mentioned, and during said movement, the confections, which are caused to be gripped by the grippers 30, are carried over a tank or reservoir 41, in which is located a bath of coating material, such as chocolate, syrup, or the like.

Beneath the tank 41 may be located a heater 42 for maintaining the coating substance in liquid form readily to be applied to the confection body of the sucker or confection being treated.

Figures 6, 7:
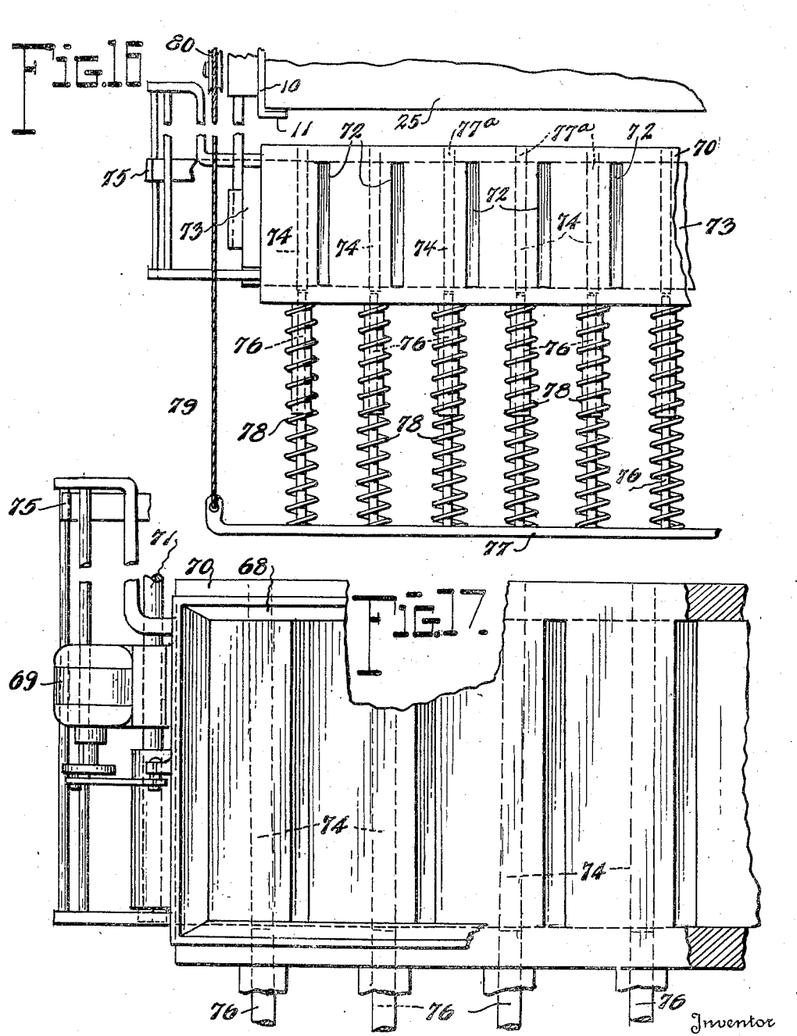
Figure 7 is an enlarged fragmentary view of the coating unit, the various dotted lines disclosing the path of a group of suckers during the dipping or coating operation.
Figure 7:
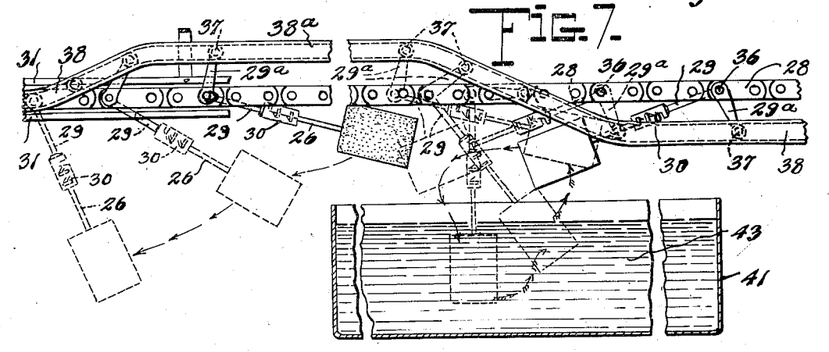

As seen in Figure 5, and better in Figure 7, the guide means 38 for the axes or pintle members of the carrier for the rollers 37 on the arms 29a of the pintle members or carriers, are deflected at their lower portions, as shown at 38a in Figure 5. On account of this deflection, as well as the general disposition of the guide means 38, after the sticks of the cut confections have been gripped by the grippers 30, they pass downwardly along the lower portions of the guide members 38 and the rollers 37 travelling in the guide parts 38 impart to the confections different angular movements that are illustrated fully in Figure 7, whereby the frozen bodies of the confection units are caused to dip down into the bath 43 in the tank or reservoir 41, and then pass out of said bath and onward with the travel of the conveyer.

The control means now to be described, by which the movements of the cutter and ejector mechanism, and the conveyer are synchronized, so that the first said mechanism will be operated as previously set forth herein, and so that the conveyer will be intermittently caused to travel to effect the coating of the bodies of the frozen confection units and deliver them to a suitable point of deposit, will now be set forth.

The said control means comprises two separate control units which will be characterized in reference to the drawings, especially Figure 6, as the cam control unit A at the right of Figure 6, and the conveyer control B at the left of Figure 6.

The cam control unit A includes a shaft 44, which is constantly driven by means of a worm gear $j$ operated by a worm 45 on a driving shaft $h$. The shaft $h$ will preferably be driven constantly by a motor 46. A sprocket chain 47 connects a sprocket on the shaft 44, with a sprocket 48 on the shaft 14, which carries the various cams 15, 18, 19 and 9, previously referred to, as comprising the cam unit.

The conveyer control unit is driven by the shaft $h$ through a worm 49 engaging a worm gear $q$ and said gear $q$ is mounted on a shaft 50 connected by a sprocket chain 51 with the driving sprocket 33a secured to shaft 40 carrying the sprockets 33, previously referred to as the driving means for the conveyer chains 28.

Bearing in mind the above method of operation, of the cam control unit A and the conveyer control unit B from the motor 46, and the shaft $h$, a description of the actuation of the cam unit, which controls the cutter and ejector mechanism operation will now be given.

As seen in Figure 6, the right hand cam control unit A is shown as turning in a contra-clockwise direction indicated by the arrow, the chain 47 rotating the cam unit shaft 14 in a similar direction for cutter and ejector operations. The unit A comprises a notched stop disc $e$, which rotates until a roller 52 on the clutch throw-out lever 53 enters the notch of said disc $e$. Thereupon, the spring $f$ rocks the lever 53 and disengages the driving clutch $g$, which is splined on the constantly rotating shaft $h$. Just prior to the seating of the roller 52 in the notch of disc $e$, the cam wheel $i$, carrying two cams and fixed to the shaft 44, causes the cam $k$ to rock the trip lever $l^x$ to the right exerting a pull on the trip rod $m$.

The pull on the trip rod $m$ thus caused in the above operation rocks the clutch shifting lever 54 throwing the clutch $o$ for the control unit of the conveyer into operative clutching position. This operation sets the conveyer control and operating unit B into action causing the conveyer chains 28 to move almost simultaneously with the stopping of the cutter and ejector control unit A.

The conveyer control unit B is in many respects a duplicate in construction of the cam assembly control unit A for the cutter and ejector mechanism. The shaft 50 of the conveyer control unit has thereon the conveyer driving sprocket $p$, which is connected by the chain drive 51 to the driven sprocket means 33a.

Also, the unit B comprises a worm drive gear $q$, a trip cam $r$, and a stop disc $s$, which is provided with one notch in which the roller 55 of the arm of the clutch lever 54 may enter and come to rest. While the stop disc $s$ only has one notch aforesaid, the stop disc $e$ has two, the latter for the control of the movements of the two sets of ejector devices.

As the pull rod $m$ is pulled, the clutch shifter 54 is rocked to the right, and the clutch $o$ to the left, thus engaging the driving clutch $o$, and raising the roller of the lever 54 out of the notch in the disc *s*. This causes the conveyer driving sprocket *p* to rotate clockwise and thus moves the conveyer chains 28 to advance the next set of grippers 30 into receiving positions, with respect to the handles of the cut confections at the lower end of the hopper 10. These confections are still disposed between the knives 3 and are ready to be ejected and gripped by the grippers.

It will be understood that the size of the sprockets *q* and 33 and the distance between the axes or pintle members 36 on the conveyer chains 28 will be such that one revolution of the control unit B will always bring the next set of grippers into substantially proper alignment with the projecting handles or sticks in the cut confections disposed between the vertical knives or cutters 3 of the cutter mechanism.

As the conveyer control B rotates and approaches its stoppage point (when the roller 55 of the lever 54 drops into the notch of the disc *s*) the cam member *r* will rock the trip lever *t*, which is similar to the trip lever *l*ˣ of the unit A, to the left, causing a pull to be exerted on the rod *u*. This rocks the clutch shift or lever 53 of the unit A to again engage the clutch *g*.

The chains 28 of the conveyer have now been stopped with the grippers in receiving position and the cam control unit A for the cutting and ejecting mechanism or unit, which had previously stopped in the position shown in Figure 10 (in dotted lines), rotates to the dotted line position of Figure 11 and stops. Thereupon, the second cam or trip lug on the trip wheel of the unit A actuates the trip lever *l*ˣ and starts the conveyer into operation again.

When the control unit for the cutting and ejecting mechanism comes to rest thereby rocking the trip lever *l*ˣ through the action of the trip lug *i*, the actuation of the pull rod *m* effects the commencement of the operation of the conveyer to advance the grippers again. In due course, when the conveyer stops, the control of motion is shifted back to the unit A and the operation continues in cycles such as above described, involving actuation of the conveyer mechanism, stoppage thereof, actuation of the cutting and ejecting mechanism, and stoppage thereof in alternation as the machine continues in action.

When the conveyer is stopped by the operation of the parts of the control unit B and the pull on the rod *u* causes operation of the cam control unit A, the cams 9, 15 and 18 rotate from the positions of Figure 11 in dotted lines through the cycle of the positions of Figure 12, as per full and dotted lines, and through the full line position of Figure 10, until they come to rest as indicated in dotted lines in Figure 10, at which time the conveyer operation is renewed by the unit B. During the above operation, the second set of ejectors 13 remained partly moved forward as the cutter device moved forward, sufficiently to clear the sticks in the block as the said block 25 moved down. The main frozen block 25 was supported along its lower rear edge by the front upper shoulder portions 13' of the second set of ejectors 13. When the cutter device moved out of the way the rollers 20 of the second set of ejectors 13 moved off of the cams 19 allowing these ejectors to fully retract and permitting the block of frozen material 25 to drop down.

Thereupon, the cutter device is moved by the cams 9 into the block of frozen material 25 to again cut a plurality of the individual confections therefrom. The cam control unit A, being still in rotation, then moves the first set of ejectors 12 to transfer the cut confection units to the conveyer grippers 30, and returns, which brings the first cycle of the operation of the cutter and ejector cam control unit A to an end, and said unit stops operating as the control is shifted back to the conveyer control unit B.

As the range of movement of the carrier members 29 and their grippers 30 is clearly depicted in Figure 5 and in Figure 7, it is not believed necessary to describe the same further in detail as the method of shifting the individual confections to obtain the dipping of them in the bath 43, for coating purposes involves merely a rotation of the axis or pintle members 36 of the carrier members 29 to cause a sort of dipping downwards of the frozen bodies of the confections until submerged in the bath 43, and thereafter cause a rearward upward movement of said bodies to raise them out of the bath as they travel further along with the conveyer and away from the tank or reservoir 41. The dipping or coating operation is arranged to take place between each cycle of movement of the conveyer. The particular confections adjacent to the coating tank 41 being treated on each intermittent action of the reservoir.

Automatic means may be used to release the coated completed confections from the grippers 30 after the coating operation is completed.

Figure 8:
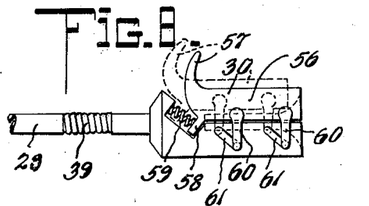
Figure 8 is a side elevation of one of the gripping devices, of the conveyer unit.
Figure 9:
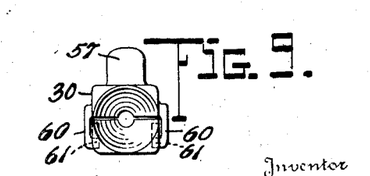
Figure 9 is a front elevational view of the gripping device shown in Figure 7.

As seen in Figures 8 and 9, the grippers 30 comprise the upper movable clamp members 56 having the off-standing projections 57. The members 56 have lugs 58 engaged by springs 59 so that normally the clamp members 56 are forced into spring gripping positions against the cooperating parts of the grippers 30.

Figures 19, 20, 22:
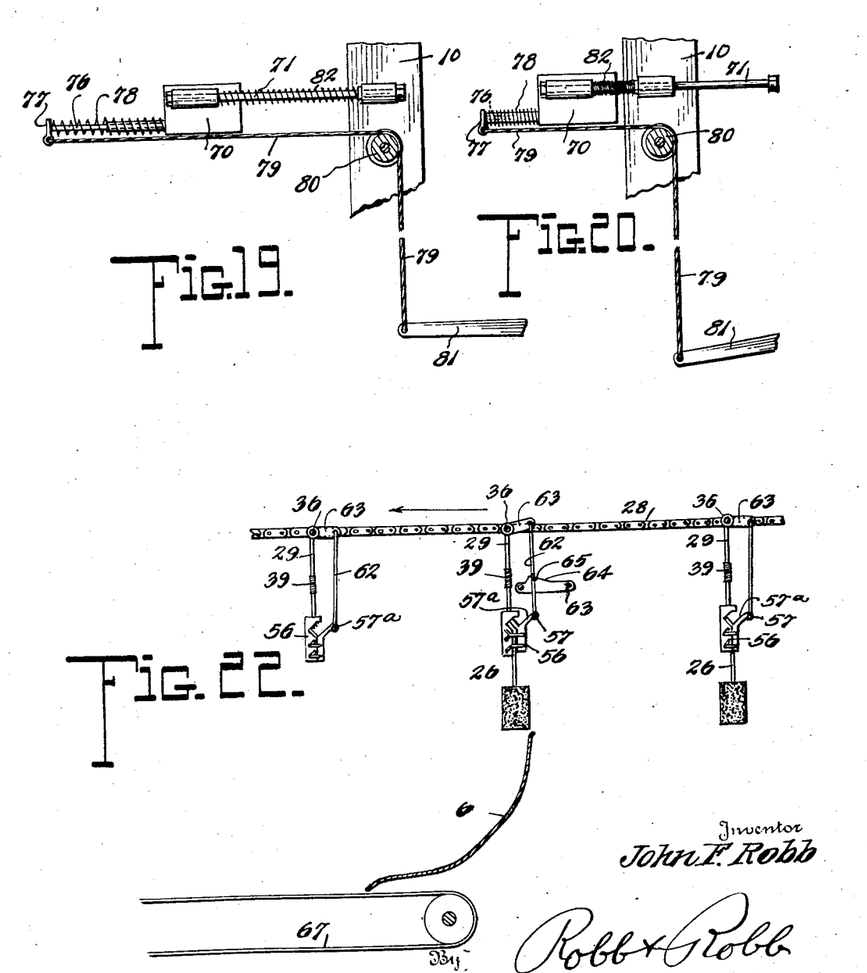
Figure 19 is a diagrammatic view of the upper portion of the confection block hopper for guiding support showing the stick feeding unit, and its associated cable actuating member. In this figure, the stick feeding unit is shown in fully retracted or inoperative position.
Figure 20 is a view similar to Figure 19 showing the stick feeding unit in its operative or stick inserting position.
Figure 22 is a fragmentary view in side elevation showing the manner of delivery of the confections to a carry-off belt or conveyer after the confections are released from the gripping devices.
Figure 21:
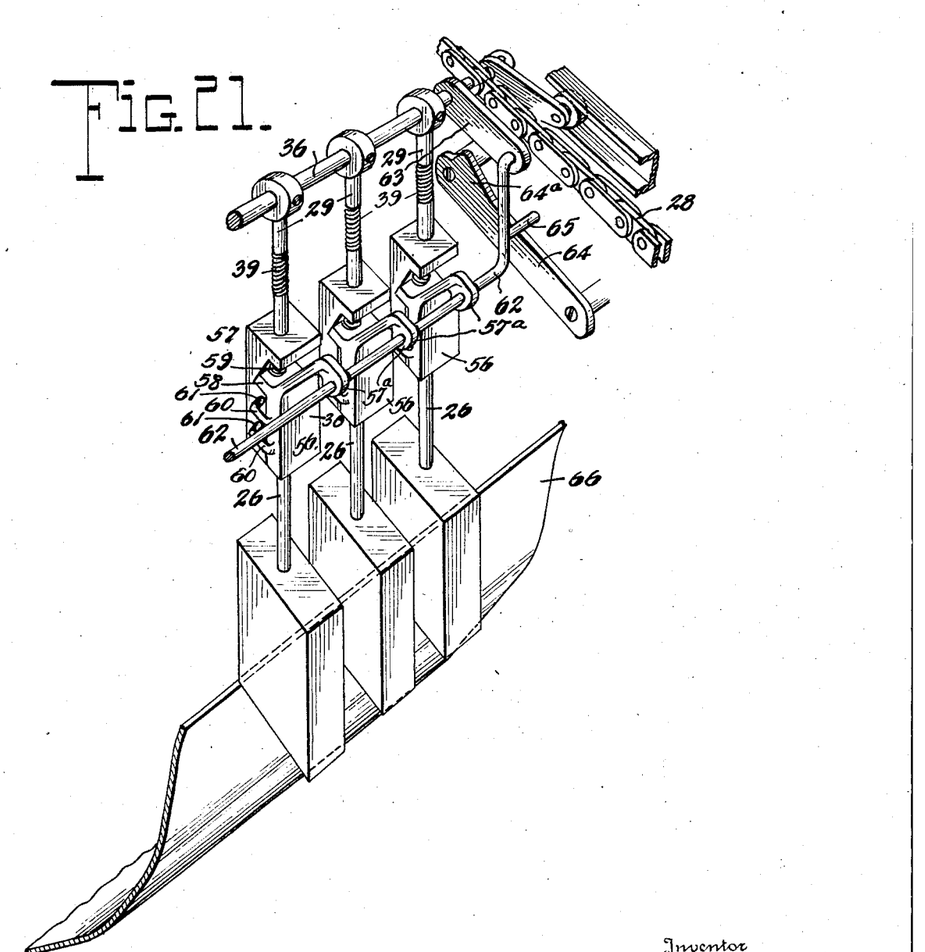
Figure 21 is a perspective view of a mechanism for automatically releasing the confections from the gripping members.

By pushing on the projections 57 guide members 60 ride up slots 61 of the members 30 and move the clamping members 56 away from the sticks or handles 26 thereby releasing the confections. The movement of the members 56 may be performed by hand or by the means shown generally in Figures 21 and 22, wherein will be seen a release bail 62 supported by arms 63 on the axis members 36. As the conveyer chains 28 come to a stop after the dipping or coating operation is completed, a cam bar 64 having a cam 64a will be engaged by pins 65 on the release bail 62. The release bail 62 is interengaged with the actuating projections 57a and the upward movement of the bail 62 by the cam 64 raises all of the clamping members 56 carried by the carrier members 29 of each axis member 36 and thereby so actuates the clamping members 56 that the clamping action of the same is destroyed and the various completed confections carried by the carrier members 29 drop on to the chute 66 from which they may pass to a delivery belt or conveyer 67.

The cam plates 64 may be shifted longitudinally by any suitable mechanical means if so desired, in which event the release action would take place after the conveyer had actually stopped.

Referring to Figures 14 to 20 inclusive, there will be noted a stick inserting mechanism that may be availed of to force the sticks or handles 26 into the frozen block of confection substance 25. When this mechanism is used, the frozen block of material 25 is placed in the hopper 10 without having any sticks already inserted therein.

The reciprocating hopper 68 is mounted for actuation by the motor 69 and disposed in front of the hopper 10. The motor 69 is carried on the main stick inserting frame 70 arranged to be reciprocated on the guides 71 fixed to the opposite sides of the hopper 10. The frame 70 is slotted at intervals as shown at 72 to provide receiving portions for the sticks fed thereto from the hopper 68.

Figure 14:
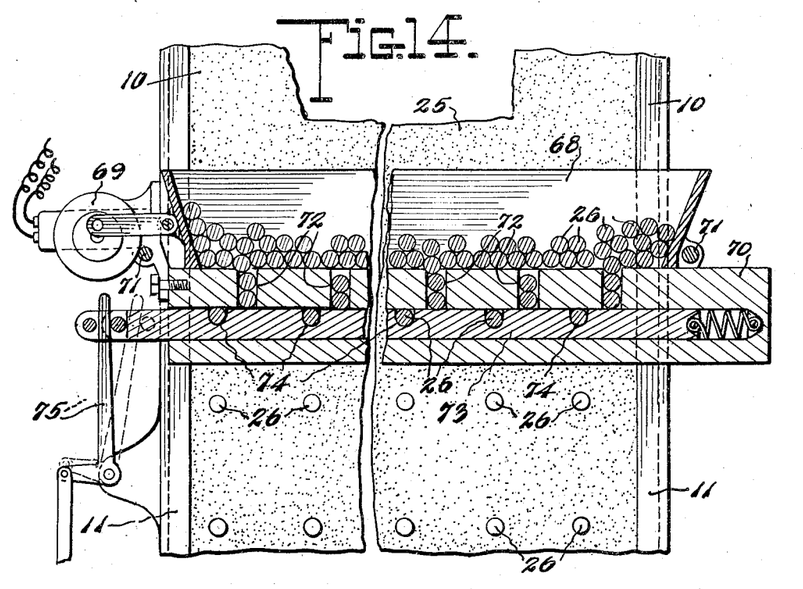
Figure 14 is a fragmentary enlarged vertical sectional view taken through a stick feeding and inserting mechanism, which may be used in conjunction with a modified embodiment of the invention, in which a block of frozen material is inserted in the hopper of the machine, without having the sticks or handles pre-frozen therein. According to this construction, the sticks are inserted in the block in proper relation after the block of material is fed downwardly and the block containing the freshly inserted sticks is cut and the individual confection units ejected and coated as in the preferred embodiment.
Figure 15:
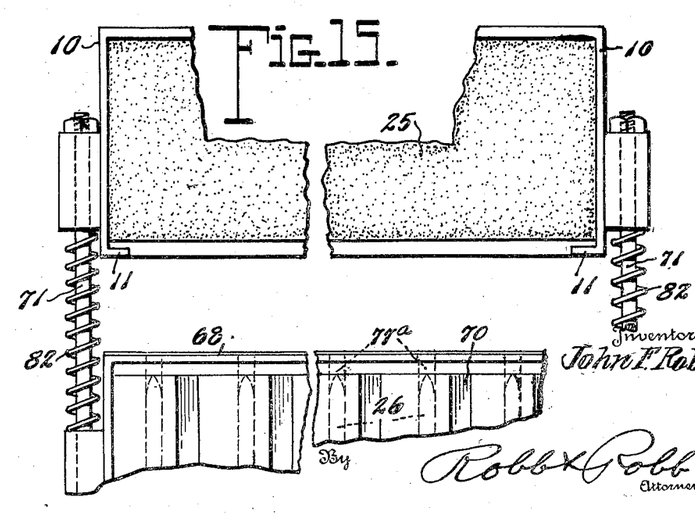
Figure 15 is a fragmentary enlarged top plan view of the upper portion of the confection block hopper or guiding support and the stick inserting unit in slightly projected position just prior to inserting a group of sticks into the block of frozen confection material.
Figure 18:
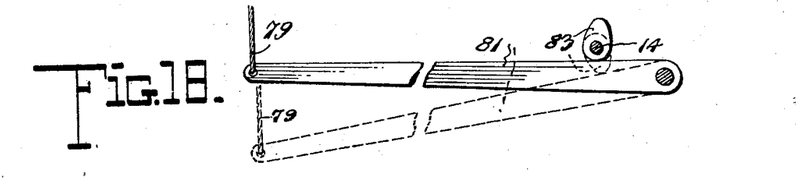
Figure 18 is a fragmentary view of the actuating cam member on the main cam unit shaft, and its associated cable tensioning lever which causes the stick inserting head to be operated for stick inserting movement.

Slidably mounted in the frame 70 is a grooved plate 73 provided with stick or handle recesses 74 each adapted to accommodate a single stick 26 arranged to be shifted to the position of Figure 14 by means of the lever 75.

Mounted in alignment with the recesses 74, when the plate 73 is shifted to stick ejecting position, are a plurality of stick ejectors 76. These ejectors 76 are secured to a common actuating head 77 held in retracted position by the springs 78, between the head 77 and the frame 70. Each end of the head 77 has fastened thereto pull cables 79 which pass over sheaves 80, and then downwardly to points of attachment to actuating levers 81. Springs 82 are interposed between the hopper 10 for the block 25 and the frame 70, the tension of these springs being somewhat less than that of the springs 78. The lever 75 may be actuated by any suitable mechanism such as by the cables 79 during their initial hopper shifting movement, or the lever 75 may be actuated in proper timed relation, by an additional cam on the cam shaft 14.

As the cam 83 is rotated by the triple cam unit shaft 14 for the cutting and ejecting mechanism, the lever 81 will be rocked downwardly causing the cables 79 to be pulled. This causes the head 77 to be moved toward the vertically disposed frozen block of material 25 in the hopper 10 and due to the greater tension of the springs 78, the springs 82 will be compressed as the main frame 70 under the influence of the springs 78 and the cables 79, is moved.

As the frame 70 moves against the hopper 10 for the block of frozen matter 25, its movement is stopped, whereupon the head 77 continues to move causing the ejectors 76 to force the sticks out of the grooves 74 through the apertures 77a and into the block of ice cream.

By moving the frame 70 into close proximity to the block of frozen matter 25, as the sticks 26 are thrust thereinto, a maximum area of support for the sticks 26 is provided, thus reducing the tendency of the sticks to bend or break when very hard ice cream is to be penetrated by the sticks.

As the cam 83 moves out of the way, permitting the lever 81 to return, the cables 79 are slacked, whereupon, the springs 78 function to withdraw the stick ejectors 76 to the position shown in Figure 16.

Thereupon, the springs 82 become effective to move the frame 70 rearwardly away from the block 25 so as to permit sufficient space for the block with the sticks just inserted to move downwardly for operation thereon by the cutting and ejecting mechanism. As the block 25 remains stationary at all times, except when it moves downwardly when the cutters 2 and 3 move out, and the second set of ejectors 13 moves fully in, the stick inserting unit is operated in synchronism with the cutter head comprising the parts 2 and 3. In other words, as the cutter members move in to cut the block 25 at its lower end, the additional cams 83 on shaft 14 will actuate the levers 81 to pull the cables 79 which actuate the stick inserting unit.

A special reason for ejecting the cut confection units with the units spaced apart the thickness of those cut units remaining in the hopper 10 is to enable each group of confection units carried by the carrier members 29 of one of the axis members 26 to be separated sufficiently that the coating or dipping of the frozen bodies of the confection will be efficiently performed.

Should by any possibility one or more of the completed confection units handled by the conveyer not be released from the grippers, a safety device is provided in the form of a switch lever 88 which will be struck by any confection left in the grippers and travelling along with the upper portion of the conveyer.

This is because the lever 88 has a lateral arm 89 in the path of movement of the sticks of such unreleased confection units and the striking of the rod 89 by the unreleased confection unit will rock the lever 88 and open the switch member 90, see Figure 5, thereby cutting off the supply of power or current to the motor 46 and stopping the motor.

It should be noted that one group of the gripper carrier members 29 are disposed in such spaced fixed positions on their axis member 36 as to cooperate with six alternately spaced cut confections when the latter are ejected from the hopper 10, and the group of carrier members 29 on the next succeeding axis member 36 will be similarly spaced out in staggered relation to the previously mentioned group because the second group of grippers on said members 29 must cooperate with the sticks or handles of confection units intermediate those which are engaged by the group of carrier members 29 in advance of the second group.

Having thus described my invention, what I claim as new and desire to secure by Letters Patent of the United States, is:

1. In a confection manufacturing machine, in combination, a hopper adapted to receive a block of confection substance, stick inserting mechanism associated with the hopper and comprising stick pushing means for forcing sticks into the confection substance in spaced relation, said sticks to form handles for individual cut units of the substance, cutting mechanism for cutting said confection substance into individual confection units after the sticks are forced therein, ejector mechanism for ejecting the cut confection units from the hopper after the cutting operation is performed, a conveyer having gripping devices thereon movable past the confection substance, said gripping devices arranged to be aligned with the sticks inserted in the cut individual confection units after the cutting action is completed and to receive and grip the said sticks when the confection units are ejected from the hopper, together with instrumentalities for causing movement of the cutting and ejecting mechanism and movement of the conveyer in timed relation.

2. In a confection manufacturing machine, a hopper to support individual confection units, stick inserting mechanism for pushing sticks into said units, ejecting mechanism for ejecting the units with the sticks inserted therein from the hopper, a conveyer having gripping devices to engage the sticks of the confection units as the latter are ejected from the hopper, means for operating the conveyer and means for stopping the conveyer with its gripping devices in proper position to cooperate with the sticks of the confection units when the ejecting mechanism operates to eject said units from the hopper.

3. A machine as set forth in claim 2, combined with control mechanism for operating the ejecting mechanism and control parts intermediate said control mechanism and the operating means for the conveyer such that the control means for the ejector mechanism sets into operation the conveyer, and the control means for the conveyer being adapted to set into operation the control means for the ejecting mechanism.

4. In a confection making machine, in combination, a confection hopper, a conveyer associated with said hopper, cutting means for cutting confection units of a confection body in said hopper, ejecting mechanism for ejecting such cut confection units from the hopper, carrier members on the conveyer movable to positions adjacent the ejecting mechanism, and means for operating the ejecting mechanism to carry cut confection units from the hopper, expand the carrier members to receive the units, and dispose the same in connected relation to the carrier members of the conveyer, and means to contract the carrier members to hold the units firmly.

5. A machine as claimed in claim 4, wherein the carrier members comprise flexible supporting parts for the purpose described.

6. In a confection making machine, in combination, a conveyer to receive and move confection units, ejecting mechanism comprising movable ejectors for shifting confection units onto the conveyer, carrier members on the conveyer to receive and support said confection units, a conveyer control unit for controlling motion and stopping of the conveyer, a control unit for controlling the operation of the ejecting mechanism, common operating means for said control units, and interconnections between said control units for effecting movement of the ejecting mechanism when the conveyer has been stopped by its control unit, said interconnections comprising parts for initiating the motion of the conveyer control unit from the ejecting mechanism control unit.

7. In a confection making machine, in combination, a hopper to receive confection material, stick supply means, mechanism for moving sticks supplied from said supply means to insert said sticks into the confection material in the hopper, cutting mechanism for cutting the material in the hopper into confection units, ejecting mechanism for ejecting the confection units with sticks inserted therein from said hopper, conveyer mechanism to receive confection units ejected from the hopper, carrier members on the conveyer mechanism comprising gripping means for holding the confections as they are carried by the conveyer mechanism, and operating means for operating the aforesaid mechanisms in timed relation for cooperation with one another.

8. In a confection making machine, in combination, a hopper to receive confection material, cutting and ejecting mechanism at the base of said hopper comprising a movable cutter for cutting the material in the hopper into separate confection units, and further comprising separate sets of ejectors, the ejectors of one set moving between the ejectors of the other set, and means for operating the ejectors of the two sets mentioned at different times.

9. In a confection making machine, in combination, a hopper to receive confection material, cutting and ejecting mechanism at the base of said hopper comprising a movable cutter for cutting the material in the hopper into separate confection units, and further comprising separate sets of ejectors, the ejectors of one set moving between the ejectors of the other set, means for operating the ejectors of the two sets mentioned at different times, and stick inserting mechanism for causing sticks to be forced into the body of confection material in the hopper, operated from said ejector operating mechanism.

10. Stick inserting mechanism for confection machines, comprising a hopper adapted to hold sticks, means for moving the hopper to agitate the sticks therein, a recessed stick guide for receiving in the recesses thereof sticks fed from the hopper, and movable plungers arranged in alignment with the recessed stick guides to engage sticks therein and produce a longitudinal movement of said sticks as described.

11. In a confection making machine, in combination, a hopper to receive confection material, a combined cutting and ejecting mechanism comprising a cutter movable in one direction to cut the confection material in the hopper, and the ejecting mechanism comprising sets of ejectors, the ejectors of one set adapted to move reversely to the ejectors of the other set, and operating means for moving the cutter and effecting said reverse movements of the sets of ejectors.

12. A machine as claimed in claim 11, in which the ejectors of one set mentioned operate to move in paths intermediate the paths of movement of the ejectors of the other set.

13. In a confection manufacturing machine, in combination, a hopper to receive a block of confection substance, cutter mechanism for cutting said block into individual confection units, ejector mechanism for ejecting the cut confection units from the hopper, a conveyer movable to carry off the confection units after ejection from the hopper, and gripper devices carried by the conveyer to cooperate with the cut confection units as they are ejected from the hopper to receive and hold the said units in proper positions on the conveyer as they are carried off by the latter, combined with stick inserting mechanism adjacent to said hopper and including a pushing device for forcing sticks into the confection substance at a time related to the action thereon of the cutting and ejecting mechanism, the gripper devices being adapted to directly engage the sticks of the cut confection units in cooperating therewith to hold them while carried by the conveyer.

14. In a confection manufacturing machine, in combination, a hopper to receive a block of confection substance, cutting and ejecting mechanism cooperating with the said hopper to cut the confection substance into individual confection units and eject said units from the hopper, a conveyer arranged to receive the confection units when ejected from the hopper and carry them off to a point of deposit, a control unit for operation of the cutting and ejecting mechanism, a control unit for controlling the operation of the conveyer to effect movement thereof, and stoppage thereof, and means intermediate said two control units whereby to automatically cause effective operation of one control unit by the other, wherein the last mentioned means comprises clutch mechanism, one for each control unit, with instrumentalities whereby the clutch mechanism of one control unit is shifted to clutching position as the clutch mechanism for the other control unit is shifted to unclutching position, so that the conveyer movement is stopped when the operation of the cutting and ejecting mechanism takes place and started when the operation of the cutting and ejecting mechanism ceases.

15. In a confection making machine, in combination, a conveyer to receive and move confection units, ejecting mechanism comprising movable ejectors for shifting confection units onto the conveyer, carrier members on the conveyer to receive and support said confection units, a conveyer control unit for controlling motion and stopping of the conveyer, a control unit for controlling the operation of the ejecting mechanism, common operating means for said control units, and interconnections between said control units for effecting movement of the ejecting mechanism when the conveyer has been stopped by its control unit, the interconnections referred to comprising parts for initiating the motion of the conveyer control unit from the ejecting mechanism control unit, and vice versa.

16. In a confection making machine, in combination, a hopper for confection material, combination cutting and ejecting means for cutting confection units out of the material in the hopper and ejecting the same therefrom, a conveyer arranged to receive and carry the confection units ejected from the hopper, and mechanism for operating said parts in proper coordination, including a cam control unit comprising cams to shift the cutting and ejecting mechanism in relation to the hopper, a conveyer control unit for moving and stopping the conveyer, and operating means for both of said control units to actuate the same in timed relation, said cam control unit and the conveyer control unit including stop and clutch devices, the stop devices to stop the movement of each control unit and the clutch devices cooperative to stop and start each control unit, the interconnections between the cam control unit and the conveyer control unit whereby each unit is adapted to initiate operation of the other unit with proper timing of such operation.

JOHN F. ROBB.